United States Patent
Kim

(10) Patent No.: US 12,424,085 B2
(45) Date of Patent: Sep. 23, 2025

(54) TARGET IDENTIFICATION AND CLASSIFICATION VEHICLE SYSTEM AND STORAGE MEDIUM STORING PROGRAM

(71) Applicant: DENSO CORPORATION, Kariya (JP)

(72) Inventor: Juick Kim, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 18/158,924

(22) Filed: Jan. 24, 2023

(65) Prior Publication Data

US 2023/0169849 A1 Jun. 1, 2023

Related U.S. Application Data

(63) Continuation of application No. PCT/JP2021/029133, filed on Aug. 5, 2021.

(30) Foreign Application Priority Data

Aug. 19, 2020 (JP) ................ 2020-138673

(51) Int. Cl.
| | |
|---|---|
| G08G 1/01 | (2006.01) |
| G08G 1/052 | (2006.01) |
| G08G 1/056 | (2006.01) |
| B60W 30/09 | (2012.01) |
| B60W 30/095 | (2012.01) |
| G08G 1/16 | (2006.01) |

(52) U.S. Cl.
CPC ........... *G08G 1/0112* (2013.01); *G08G 1/052* (2013.01); *G08G 1/056* (2013.01); *B60W 30/09* (2013.01); *B60W 30/0956* (2013.01); *B60W 2420/403* (2013.01); *B60W 2420/408* (2024.01); *G08G 1/166* (2013.01)

(58) Field of Classification Search
CPC ............................. G08G 1/052; G08G 1/0112
See application file for complete search history.

(56) References Cited

U.S. PATENT DOCUMENTS

| | | | |
|---|---|---|---|
| 2017/0214747 A1* | 7/2017 | Schulte | H04L 67/12 |
| 2018/0067490 A1* | 3/2018 | Pollach | B60W 30/0956 |
| 2018/0350094 A1* | 12/2018 | Wang | G06T 7/292 |
| 2019/0035277 A1* | 1/2019 | Son | G08G 1/163 |
| 2019/0114921 A1* | 4/2019 | Cazzoli | G06V 20/58 |
| 2019/0371178 A1 | 12/2019 | Fukami | |
| 2020/0109954 A1* | 4/2020 | Li | G01C 21/3848 |
| 2020/0283002 A1* | 9/2020 | Gupta | G08G 1/096741 |

FOREIGN PATENT DOCUMENTS

| | | |
|---|---|---|
| CN | 108983247 A | 12/2018 |
| JP | 2007310457 A | 11/2007 |
| JP | 2018081609 A | 5/2018 |
| JP | 2019079316 A | 5/2019 |

* cited by examiner

*Primary Examiner* — Jess Whittington
(74) *Attorney, Agent, or Firm* — Harness, Dickey & Pierce, P.L.C.

(57) ABSTRACT

A vehicle system detects, as a first target information item, target information related to a target within sight from a subject vehicle based on sensor information of a sensor of the subject vehicle. The vehicle system acquires, as a second target information item, target information related to a target detected based on sensor information of a sensor of a mounted object.

12 Claims, 7 Drawing Sheets

TARGET IDENTIFICATION AND CLASSIFICATION VEHICLE SYSTEM AND STORAGE MEDIUM STORING PROGRAM

CROSS REFERENCE TO RELATED APPLICATIONS

The present application is a continuation application of International Patent Application No. PCT/JP2021/029133 filed on Aug. 5, 2021, which designated the U.S. and claims the benefit of priority from Japanese Patent Application No. 2020-138673 filed on Aug. 19, 2020. The entire disclosures of all of the above applications are incorporated herein by reference.

TECHNICAL FIELD

The present disclosure relates to a vehicle system and a non-transitory tangible computer readable storage medium.

BACKGROUND

A system has been proposed which detects target information such as position information, moving speed, moving direction, type information, or the like regarding a target within sight from the subject vehicle, such as a pedestrian, a bicycle, or the like based on sensor information of a sensor of a subject vehicle, and provides correlation information between the subject vehicle and the target as a safety service using detected target information. In addition, another system has been proposed which receives mounted object information such as position information, moving speed, moving direction, type information, or the like regarding a mounted object such as road infrastructure and target information detected based on sensor information of a sensor of the mounted object by performing vehicle-to-vehicle communication and vehicle-to-infrastructure communication with other vehicles and mounted objects, and provides correlation information between the subject vehicle and the target as a safety service using detected mounted object information and target information. For example, a configuration has been proposed which detects target object information based on sensor information of a sensor of the subject vehicle, and performs vehicle-to-vehicle communication and vehicle-to-infrastructure communication with mounted objects such as other vehicles and road infrastructure.

SUMMARY

The present disclosure provides a vehicle system. The vehicle system detects, as a first target information item, target information related to a target within sight from a subject vehicle based on sensor information of a sensor of the subject vehicle. The vehicle system acquires, as a second target information item, target information related to a target detected based on sensor information of a sensor of a mounted object.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
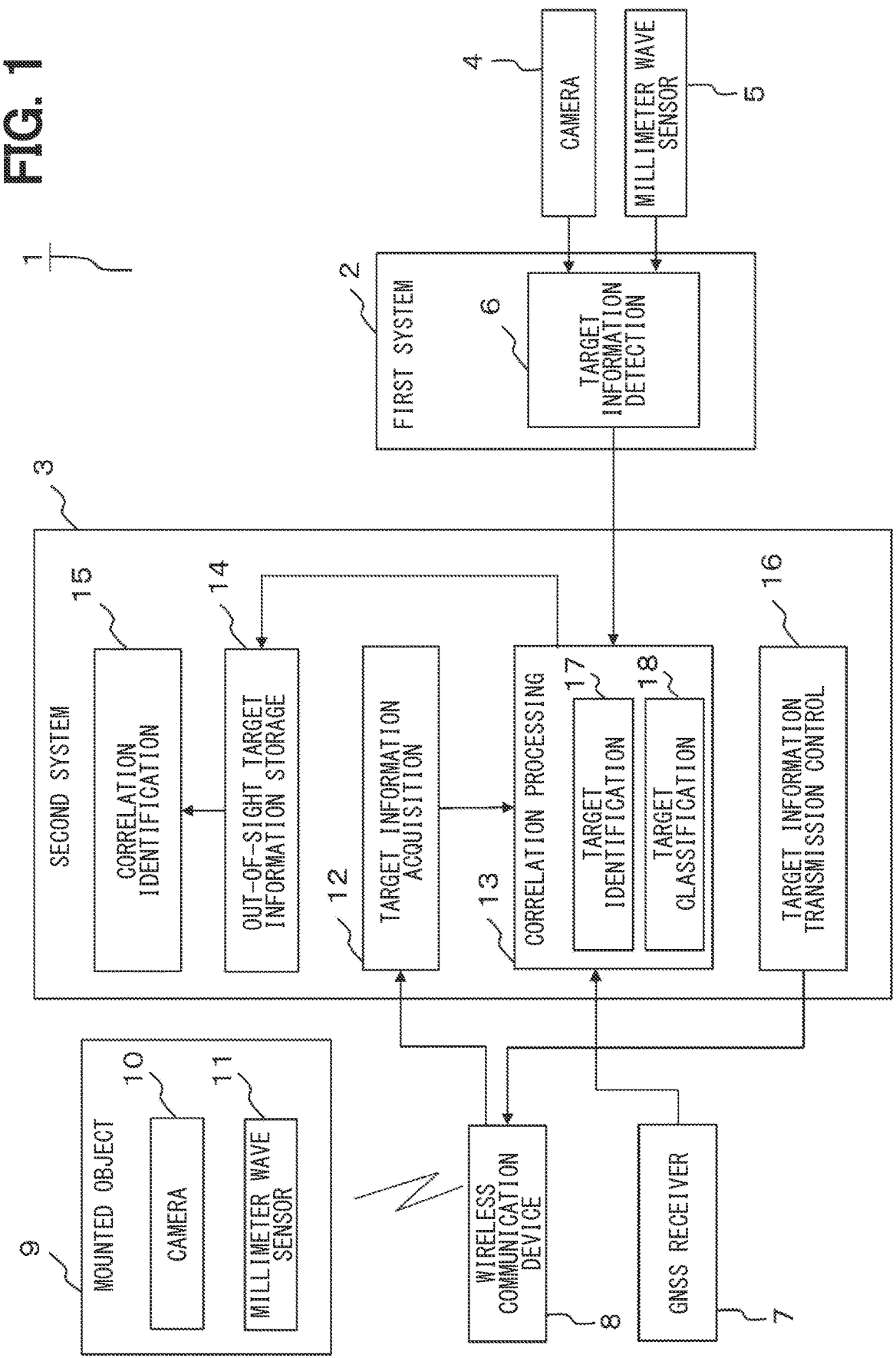
FIG. 1 is a functional block diagram showing one embodiment.

For example, the configuration in which the above two systems coexist has the following difficulties. That is, when multiple mounted objects exist around the subject vehicle, multiple target information items transmitted from the multiple mounted objects will be received. Thus, in order to enhance reliability of a safety service, it is necessary to determine whether the multiple targets identified by the multiple target information items are an identical target or individual targets in order to identify targets individually, and it is necessary to deal with the identified targets according to a situation.

The present disclosure provides a safety service by appropriately identifying a target individually and appropriately processing an identified individual according to a situation.

An exemplary embodiment of the present disclosure provides a vehicle system that includes a target information detection unit, a target information acquisition unit, a target identification unit, and a target classification unit. The target information detection unit detects, as a first target information item, target information related to a target within sight from a subject vehicle based on sensor information of a sensor of the subject vehicle. The target information acquisition unit acquires, as a second target information item, target information related to a target detected based on sensor information of a sensor of a mounted object. The target identification unit identifies a plurality of targets individually identified by a plurality of second target information items as an identical target or individual targets. The target classification unit classifies a target identified as the identical target by the target identification unit into a target within sight or a target out of sight based on the first target information item.

In the exemplary embodiment of the present disclosure, the plurality of targets individually identified by the plurality of second target information items are identified as either the identical individual or individual targets, and the target identified as the identical target is classified into the target within sight or the target out of sight based on the first information item. That is, the configuration identifies the plurality of targets identified by the plurality of target information items detected based on the sensor information of the sensor of the mounted object are as either the identical target or individual targets, and identifies the target identified as the identical target into the target within sight or the target out of sight based on the first information item. This configuration can provide a safety service by appropriately identifying a target individually and appropriately processing the identified individual according to the situation. That is, the reliability of the system can be improved by identifying multiple targets as either the identical target or individual targets, and the reliability of the system can be improved by limiting the targets to be processed by classifying the targets into the target within sight and the target out of sight.

Hereinafter, an embodiment will be described with reference to the drawings. As shown in FIG. 1, a vehicle system 1 mounted on a vehicle is configured such that a first system 2 and a second system 3 is capable of transmitting and receiving data via a bus. The bus corresponds to, for example, CAN (controller area network, registered trademark), LIN (local interconnect network, registered trademark), CXPI (clock extension peripheral interface, registered trademark), FlexRay (registered trademark), MOST (media oriented systems transport, registered trademark), or the like. The first system 2 and the second system 3 may each be provided by an electronic control unit (ECU).

The first system 2 is a system having an Advanced Driver Assistance System (ADAS) function. The first system 2 connects a camera 4 that captures surroundings of a subject vehicle and a millimeter wave sensor 5 that detects the surroundings of the subject vehicle. The first system 2 receives image information of the camera 4 and detection information of the millimeter wave sensor 5. The camera 4 and the millimeter wave sensor 5 correspond to sensors of the subject vehicle, and the image information of the camera 4 and the detection information of the millimeter wave sensor 5 correspond to sensor information of the sensors of the subject vehicle. In this embodiment, the image information is input from the camera 4 and the detection information is input from the millimeter wave sensor 5. Alternatively, a radar or Lidar (Light detection and Ranging) to input detection information of radar or lidar. That is, any sensor may be employed as a sensor for detecting condition of the surroundings of the subject vehicle.

The first system 2 is constituted by a microcomputer having a CPU (Central Processing Unit), a ROM (Read Only Memory), a RAM (Random Access Memory), and an I/O device (Input/Output device). The microcomputer executes a control program stored in a non-transitory tangible storage medium to execute processing corresponding to the control program, thereby controlling the operation of the first system 2. The first system 2 includes a target information detection unit 6 as a functional block executed by the microcomputer.

When the image information is input from the camera 4 and the detection information is input from the millimeter wave sensor 5, the target information detection unit 6 processes the input image information and detection information, and detects target information regarding a target within sight from the subject vehicle, such as position information, moving speed, moving direction, type information, or the like. A target detected by the target information detection unit 6 is a target that exists around the subject vehicle, such as a pedestrian, a bicycle, or the like, and also a target that may affect the traveling of the subject vehicle. That is, the target information detection unit 6 detects the target information regarding a pedestrian, a bicycle, or the like that exists around the subject vehicle, such as position information, moving speed, moving direction, type information, or the like. When detecting the target information, the target information detection unit 6 transmits the detected target information to the second system 3 as a first target information item.

The first system 2 detects the target information and performs operation control such as avoidance of collision with the target. That is, when determining that there is a possibility that the subject vehicle will collide with a target, the first system 2 performs acceleration control, brake control, steering control, and the like so as to avoid collision with the target by cooperating with an accelerator control ECU that performs the accelerator control, a brake control ECU that performs the brake control, a steering control ECU that performs the steering control, and the like.

The second system 3 is a system having a V2X function. V2X is a general term for V2V (Vehicle to Vehicle), which is data communication between the subject vehicle and other vehicles, V2I (Vehicle to Infrastructure), which is data communication between the subject vehicle and roadside equipment, V2P (Vehicle to Pedestrian), which is data communication between pedestrians or bicycles, and the like.

The second system 3 is connected to a Global Navigation Satellite System (GNSS) receiver 7, and inputs positioning information acquired by positioning by the GNSS receiver 7 as positioning information of the subject vehicle. GNSS is a general term for satellite positioning systems such as a Global Positioning System (GPSS), a Global Navigation Satellite System (GLONASS), Galileo, and the like.

The second system 3 is connected to a wireless communication device 8. The mounted object 9 includes a camera 10 that captures the surroundings of the mounted object 9 and a millimeter wave sensor 11 that defines the surroundings of the mounted object 9 as a detection area. The wireless communication device 8 receives mounted object information such as position information, moving speed, moving direction, type information, or the like regarding the mounted object 9 by performing data communication with a wireless communication device mounted on the mounted object 9. The wireless communication device 8 further receives target information such as position information, moving speed, moving direction, type information, or the like regarding the target detected based on image information of the camera 10 and detection information of a millimeter wave sensor 11 mounted on the mounted object 9. The camera 10 and the millimeter wave sensor 11 mounted on the mounted object 9 correspond to sensors of the mounted object 9, and the image information of the camera 10 and the detection information of the millimeter wave sensor 11 correspond to sensor information of the sensor of the mounted object 9. In this embodiment, the image information of the camera 10 is used and the detection information from the millimeter wave sensor 11 is used as an example. Alternatively, detection information of radar or Lidar that defines the surroundings of the mounted object 9 as a detection area. That is, any sensor may be employed as a sensor for detecting condition of the surroundings of the mounted object 9.

The mounted object 9 is another vehicle, a roadside equipment, a mobile information terminal carried by a person who drives a bicycle, a mobile information terminal carried by a pedestrian, or the like. The mobile information terminal is, for example, a smartphone or a tablet terminal. That is, when the mounted object 9 is another vehicle, the second system 3 receives the mounted object information regarding the other vehicle, and receives the target information regarding the target detected based on the image information of a camera and detection information of a millimeter wave sensor mounted on the other vehicle. When the mounted object 9 is a roadside equipment, the second system 3 receives the mounted object information regarding the roadside equipment, and receives the target information regarding the target detected based on the image information of a camera and detection information of a millimeter wave sensor mounted on the roadside equipment. When the mounted object 9 is a mobile information terminal carried by a person who drives a bicycle or a pedestrian, the second system 3 receives the mounted object information regarding the mobile information terminal carried by a person who drives a bicycle or a pedestrian, and receives the target information regarding the target detected based on the image information of a camera and detection information of a millimeter wave sensor mounted on the mobile information terminal carried by a person who drives a bicycle or a pedestrian. Here, the target detected based on the image information of the camera 4 of the subject vehicle and the detection information of the millimeter wave sensor 5 is the target within sight from the subject vehicle. On the other hand, the target detected based on the image information of the camera 10 of the mounted object 9 and the detection information of the millimeter wave sensor 11 is not only the target within sight from the subject vehicle but also a target out of sight from the subject vehicle.

The second system 3 is constituted by a microcomputer having a CPU, a ROM, a RAM and an I/O device. The microcomputer executes a control program stored in a non-transitory tangible storage medium to execute processing corresponding to the control program, thereby controlling the operation of the second system 3. The second system includes, as functional blocks executed by the microcomputer, a target information acquisition unit 12, a correlation processing unit 13, an out-of-sight target information storage unit 14, a correlation identification unit 15, and a target information transmission control unit 16.

The target information acquisition unit 12 acquires the mounted object information and the target information by receiving the mounted object information and the target information output from the wireless communication device 8 that receives the mounted object information and the target information transmitted from the mounted object 9. In this case, the target information acquisition unit 12 acquires the target information as a second target information item. The correlation processing unit 13 is a functional block that processes the correlation of targets, and includes a target identification unit 17 and a target classification unit 18.

Figure 2:
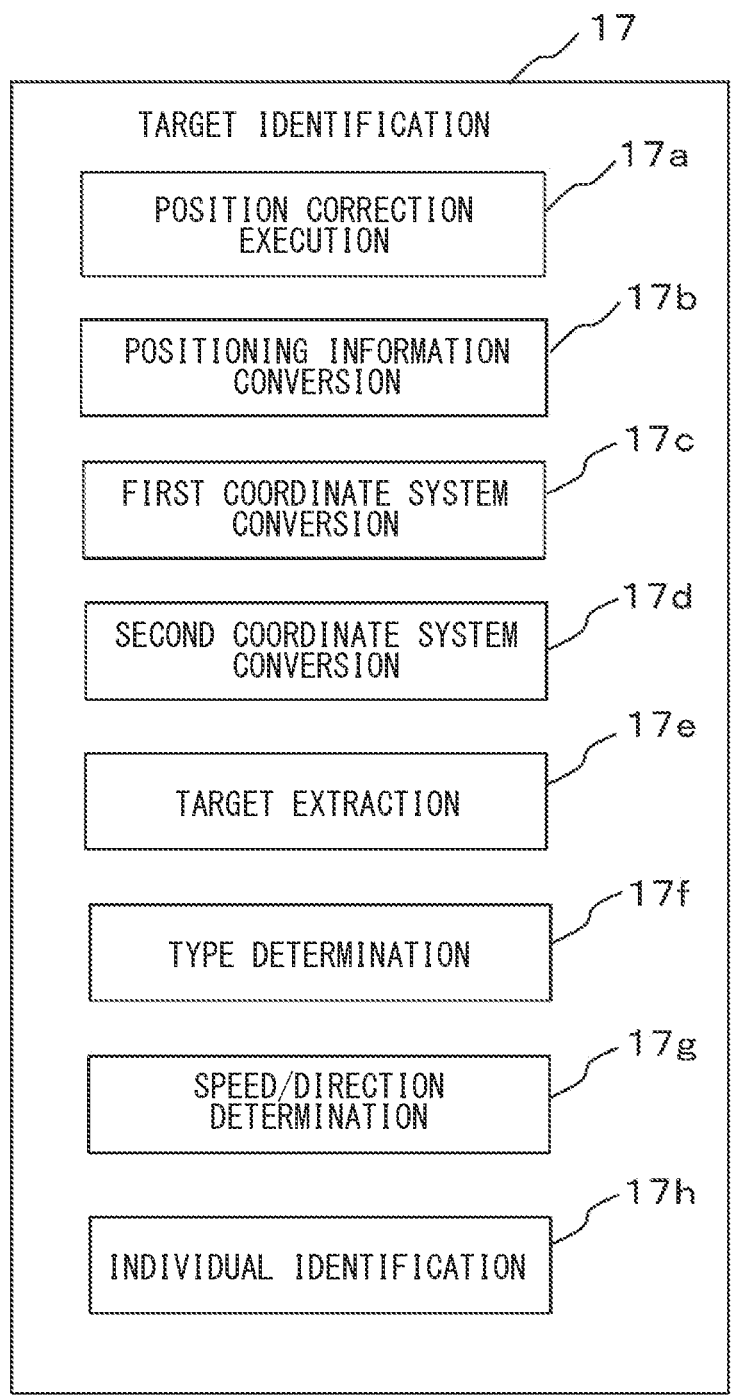
FIG. 2 is a functional block diagram showing a target identification unit.

The target identification unit 17 is a functional block that determines whether the plurality of targets individually identified by the plurality of second target information items are the identical target or individual targets when receiving the plurality of second target information items from the target information acquisition unit 12, and identifies the targets. As shown in FIG. 2, the target identification unit 17 includes a position correction execution unit 17a, a positioning information conversion unit 17b, a first coordinate system conversion unit 17c, a second coordinate system conversion unit 17d, a target extraction unit 17e, a type determination unit 17f, a speed/direction determination unit 17g, and an individual identification unit 17h.

The position correction execution unit 17a performs position correction with time based on the moving speed and the moving direction with respect to the mounted object 9. The positioning information conversion unit 17b converts the positioning information of the subject vehicle into a zero point of a XY coordinate system to generate a subject vehicle zero point XY coordinate system. The positioning information of the subject vehicle is determined by latitude and longitude. The zero point of the XY coordinate system corresponds to a reference point of a coordinate system. The subject vehicle zero point XY coordinate system corresponds to the coordinate system having the reference point of the subject vehicle. The first coordinate system conversion unit 17c converts the positioning information of the mounted object 9 into the subject vehicle zero point XY coordinate system. The positioning information of the mounted object 9 is also determined by latitude and longitude. The second coordinate system conversion unit 17d converts the target, which is identified by the target information detected based on the image information of the camera 10 of the mounted object 9 and the detection information of the millimeter wave sensor 11, into the subject vehicle zero point XY coordinate system by synthesizing the relative distance and the moving direction of the target into the subject vehicle zero point XY coordinate system.

The target extraction unit 17e extracts targets whose positions in the subject vehicle zero point XY coordinate system overlap within a certain error. That is, when multiple target information items are detected based on the image information of the camera 10 and the detection information of the millimeter wave sensor 11 of the plurality of mounted objects 9, the target extraction unit 17e determines whether positions of the targets identified by each of the multiple target information items overlap with each other.

When targets with overlapping positions are extracted by the target extraction unit 17e, the type determination unit 17f determines the positional accuracy and reliability of the mounted objects 9, and, on condition that the positional accuracy of the mounted object 9 is equal to or higher than a predetermined level and the reliability of the mounted object 9 is equal to or higher than a predetermined level, determines whether or not the types of the targets whose extracted positions overlap are identical. When the type determination unit 17f determines that the types of the targets having the same extracted positions are identical, the speed/direction determination unit 17g determines whether or not the moving speeds and the moving directions of the targets whose types are identical are identical.

When the speed/direction determination unit 17g determines that the targets of the identical type have the identical moving speed and moving direction, the individual identification unit 17h identifies, as an identical target, the targets whose types are identical and whose moving speeds and moving directions are identical. On the other hand, when the type determination unit 17f determines that the types are not identical, the individual identification unit 17h identifies the targets whose types are determined as not the same as individual targets. When the type determination unit 17f determines that the types are identical but the speed/direction determination unit 17g determines that at least one of the moving speeds and the moving directions of the targets are not identical, the individual identification unit 17h identifies, as individual targets, the targets whose types are identical but whose at least one of the moving speeds and the moving directions are not identical.

Figure 3:
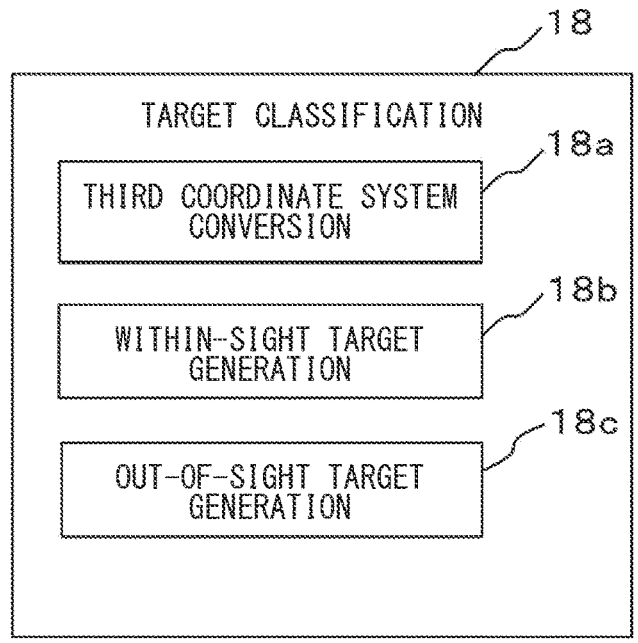
FIG. 3 is a functional block diagram showing a target classification unit.

The target classification unit 18 is a functional block that classifies a target identified as the identical target into a target within sight or a target out of sight. As shown in FIG. 3, the target classification unit 18 includes a third coordinate system conversion unit 18a, a within-sight target generation unit 18b, and an out-of-sight target generation unit 18c. The target within sight is a target within sight from the subject vehicle, and a target existing within the imaging area of the camera 4 of the subject vehicle or the detection area of the millimeter wave sensor 5. The target within sight is a target capable of being detected directly from the image information of the camera 4 and the detection information of the millimeter wave sensor 5. The target out of sight is a target out of sight from the subject vehicle, and a target existing out of the imaging area of the camera 4 of the subject vehicle or the detection area of the millimeter wave sensor 5. The target out of sight is a target incapable of being detected directly from the image information of the camera 4 and the detection information of the millimeter wave sensor 5.

The third coordinate system conversion unit 18a converts the target within sight of the subject vehicle, which is identified by the target information detected as the first target information item by the target information detection unit 6, into the subject vehicle zero point XY coordinate system by synthesizing relative distance and moving direction of the target into the subject vehicle zero point XY coordinate system. The within-sight target generation unit 18b generates, as the target within sight, the target converted into the subject vehicle zero point XY coordinate system. The out-of-sight target generation unit 18c generates the target out of sight by synthesizing the target which is identified as the identical target by the target identification unit 17 and the target within sight generated by the within-sight target generation unit 18b.

When the target classification unit 18 classifies a target as the target out of sight, the out-of-sight target information storage unit 14 sores the target information regarding the target out of sight as out-of-sight target information. The correlation identification unit 15 identifies the correlation of out-of-sight target information stored in the out-of-sight target information storage unit 14.

Figure 4:
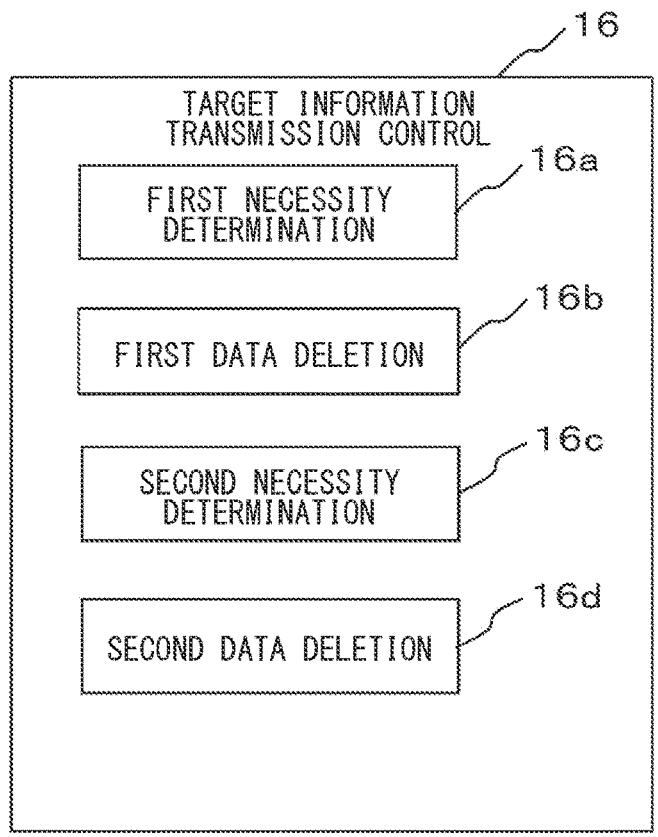
FIG. 4 is a functional block diagram showing a target information transmission control unit.

The target information transmission control unit 16 is a functional block that controls transmission of the target information. As shown in FIG. 4, the target information transmission control unit 16 includes a first necessity determination unit 16a, a first data deletion unit 16b, a second necessity determination unit 16c, and a second data deletion unit 16d.

The first necessity determination unit 16a determines confirms an optional transmission item in the target message format, confirms a transmission conditions of the optional transmission item, and determines whether or not the transmission of the optional transmission item is necessary. The optional transmission item is data that is transmitted under arbitrary conditions such as the occurrence of an event. When the first necessity determination unit 16a determines that the transmission of the optional transmission item is not necessary, the first data deletion unit 16b deletes the data corresponding to the arbitrary transmission item for which transmission is determined to be unnecessary from the target message format.

The second necessity determination unit 16c determines confirms a free transmission item in the target message format, confirms a transmission conditions of the free transmission item, and determines whether or not the transmission of the free transmission item is necessary. The free transmission item is data freely set and transmitted on the system side, such as traveling speed. When the second necessity determination unit 16c determines that the transmission of the free transmission item is not necessary, the second data deletion unit 16d deletes the data corresponding to the free transmission item for which transmission is determined to be unnecessary from the target message format.

Next, the process of the above configuration will be described with reference to FIGS. 5 to 8. Here, target identification processing performed by the target identification unit 17, target classification processing performed by the target classification unit 18, and target information transmission control processing performed by the target information transmission control unit 16 will be sequentially described. In addition, since there are multiple mounted objects 9 around the subject vehicle, and each of the multiple mounted objects 9 are capable of detecting target information items, mounted objects (n) indicate that there are multiple mounted objects 9 and targets (n) indicate there are multiple targets as shown in FIGS. 5 to 8.

(1) Target Identification Processing

Figure 5:
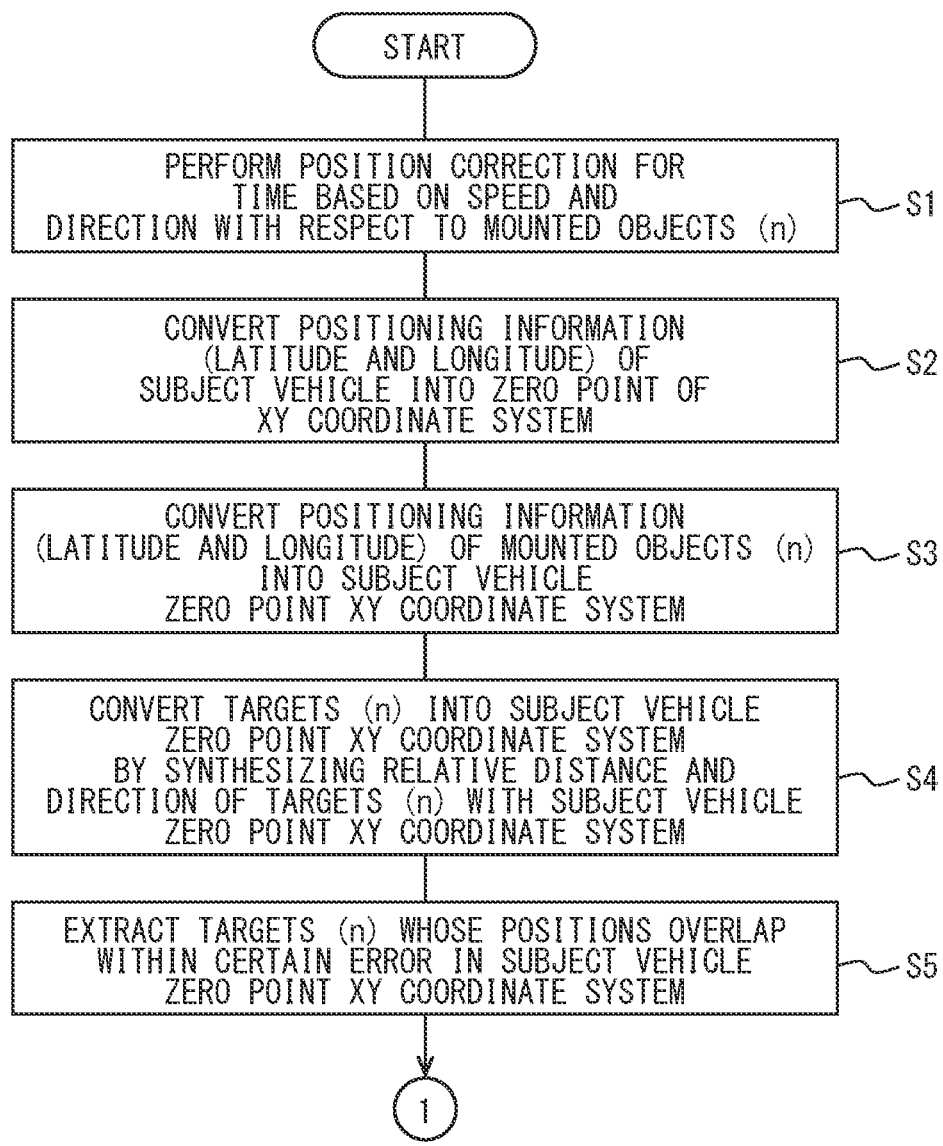
FIG. 5 is a flowchart (part 1) showing a target identification processing.
Figure 6:
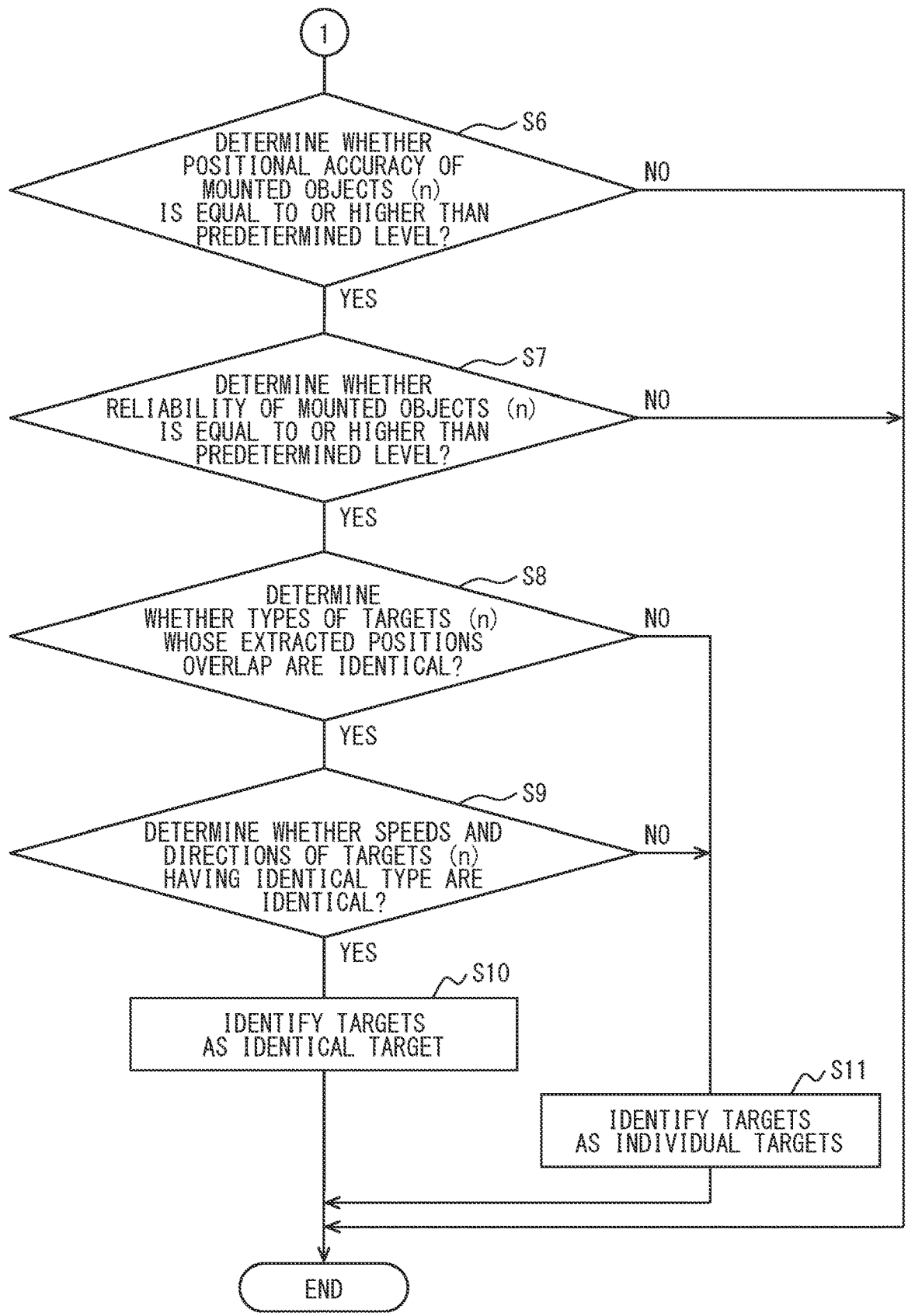
FIG. 6 is a flowchart (part 2) showing a target identification processing.

The target identification processing performed by the target identification unit 17 will be described with reference to FIGS. 5 and 6.

When starting the target identification processing, the target identification unit 17 acquires target information items regarding targets (n) detected based on the sensor information of sensors of mounted objects (n) (corresponding to a target information acquisition process), and performs position correction for time based on the moving speed and the moving direction with respect to the mounted objects (n) (S1). The target identification unit 17 converts the positioning information (latitude and longitude) of the subject vehicle into the zero point of the XY coordinate system (S2). The target identification unit 17 converts the positioning information (latitude and longitude) of the mounted objects (n) into the subject vehicle zero point XY coordinate system (S3).

The target identification unit 17 converts the targets (n) into the subject vehicle zero point XY coordinate system by synthesizing the relative distance and moving direction of the target (n) with the subject vehicle zero point XY coordinate system (S4). The target identification unit 17 extracts targets (n) whose positions overlap within a certain error in the subject vehicle zero point XY coordinate system (S5). When the targets (n) whose positions overlap within a certain error is extracted, the target identification unit 17 determines whether or not the positional accuracy of each of the mounted objects (n) is equal to or higher than a predetermined level (S6). When determining that the positional accuracy of each of the mounted objects (n) is equal to or higher than the predetermined level (S6: YES), the target identification unit 17 determines whether or not the reliability of each of the mounted objects (n) is equal to or higher than a predetermined level (S7). When determining that the reliability of each of the mounted objects (n) is equal to or higher than the predetermined level (S7: YES), the target identification unit 17 determines whether the types of the targets (n) whose extracted positions overlap are identical (S8). When determining that the types of targets (n) whose extracted positions overlap are identical (S8: YES), the target identification unit 17 determines whether the moving speeds and moving directions of the targets (n) having the identical type are identical (S9).

When determining that the moving speeds and moving directions of the targets (n) having the identical type are identical (S9: YES), the target identification unit 17 identifies, as the identical target, the targets (n) whose types are identical and whose moving speeds and moving directions are identical (S10, corresponding to a target identification process), and then the target identification processing is terminated. On the other hand, when determining that the types of the targets (n) whose extracted positions overlap with each other are not the same (S8: NO), the target identification unit 17 identifies, as the individual targets, targets (n) whose types are not identical (S11, corresponding to a target identification process), and then the target identification processing is terminated.

When the target identification unit 17 determines that the types are identical but at least one of the moving speeds and the moving directions of the targets are not identical (S9: NO), the target identification unit 17 identifies, as individual targets, the targets (n) whose types are identical but whose at least one of the moving speeds and the moving directions are not identical (S11). Note that when the target identification unit 17 determines that the positional accuracy of each of the mounted objects (n) is not equal to or higher than the predetermined level (S6: NO), or determines that the reliability of each of the mounted objects (n) is not equal to or higher than the predetermined level (S7: NO), the target identification unit 17 does not identify the individuals, and the target identification processing is terminated.

(2) Target Classification Processing

Figure 7:
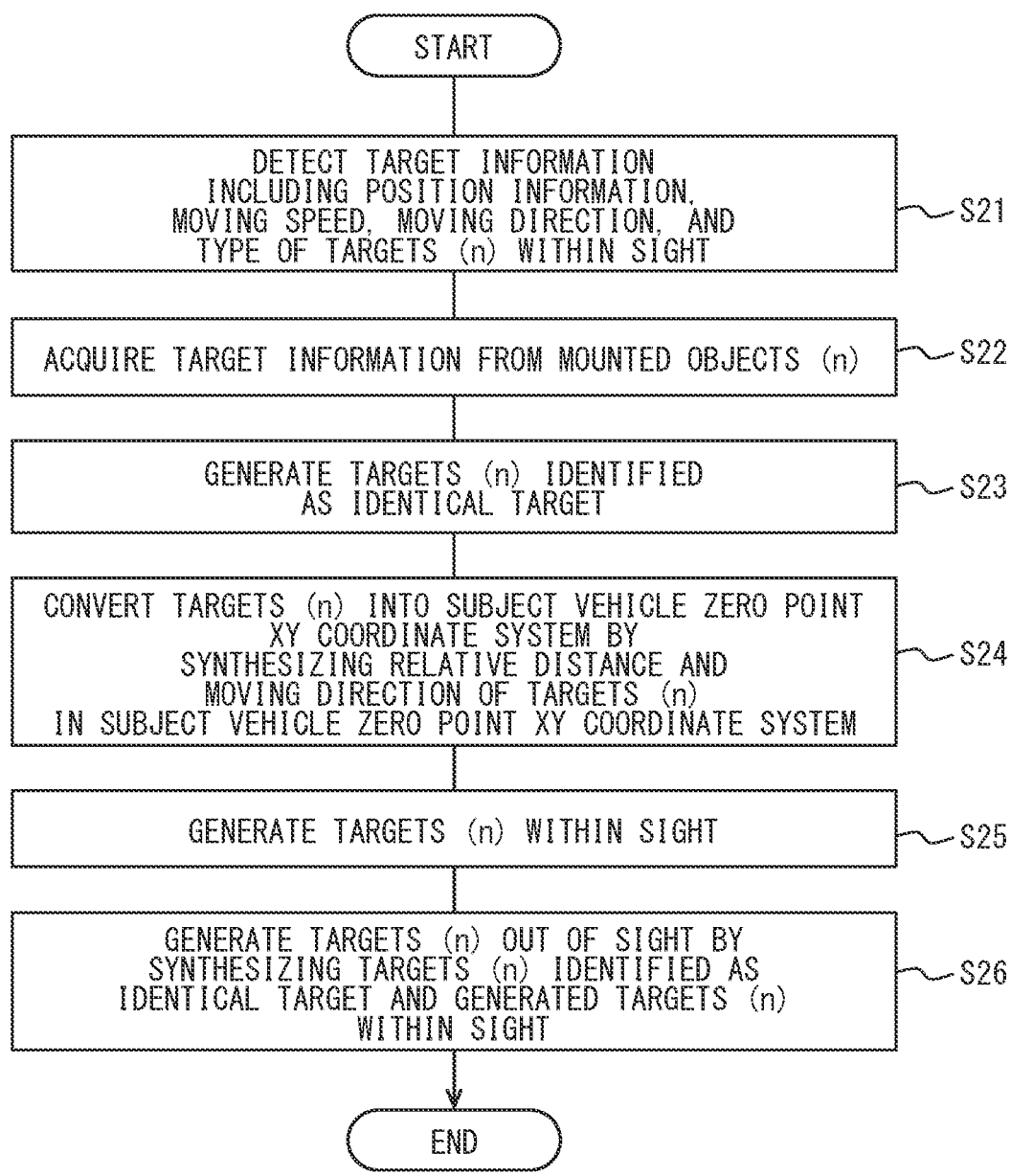
FIG. 7 is a flowchart showing target classification processing.

The target classification processing performed by the target classification unit 18 will be described with reference to FIG. 7.

When target classification processing is started, the target classification unit 18 detects the target information including the position information, the moving speed, the moving direction, and the type of the targets (n) within sight from the subject vehicle based on the first target information item input from the first system 2 (S21, corresponding to the target information detection process). The target classification unit 18 acquires the target information from the mounted objects (n) (S22), and generates the targets (n) identified as the identical target (S23).

The target classification unit 18 converts the targets (n) identified by the target information detected as the first target information item by the target information detection unit 6 by synthesizing the relative distance and moving direction of the targets (n) (S24), and generates, as the targets (n) within sight from the subject vehicle, the targets converted into the subject vehicle zero point XY coordinate system (S25, corresponding to target classification process). The target classification unit 18 generates the targets (n) out of sight by synthesizing the targets (n) identified as the identical target and the generated targets (n) within sight (S26, corresponding to a target classification process), and then the target classification processing is terminated.

(3) Target Information Transmission Control Processing

Figure 8:
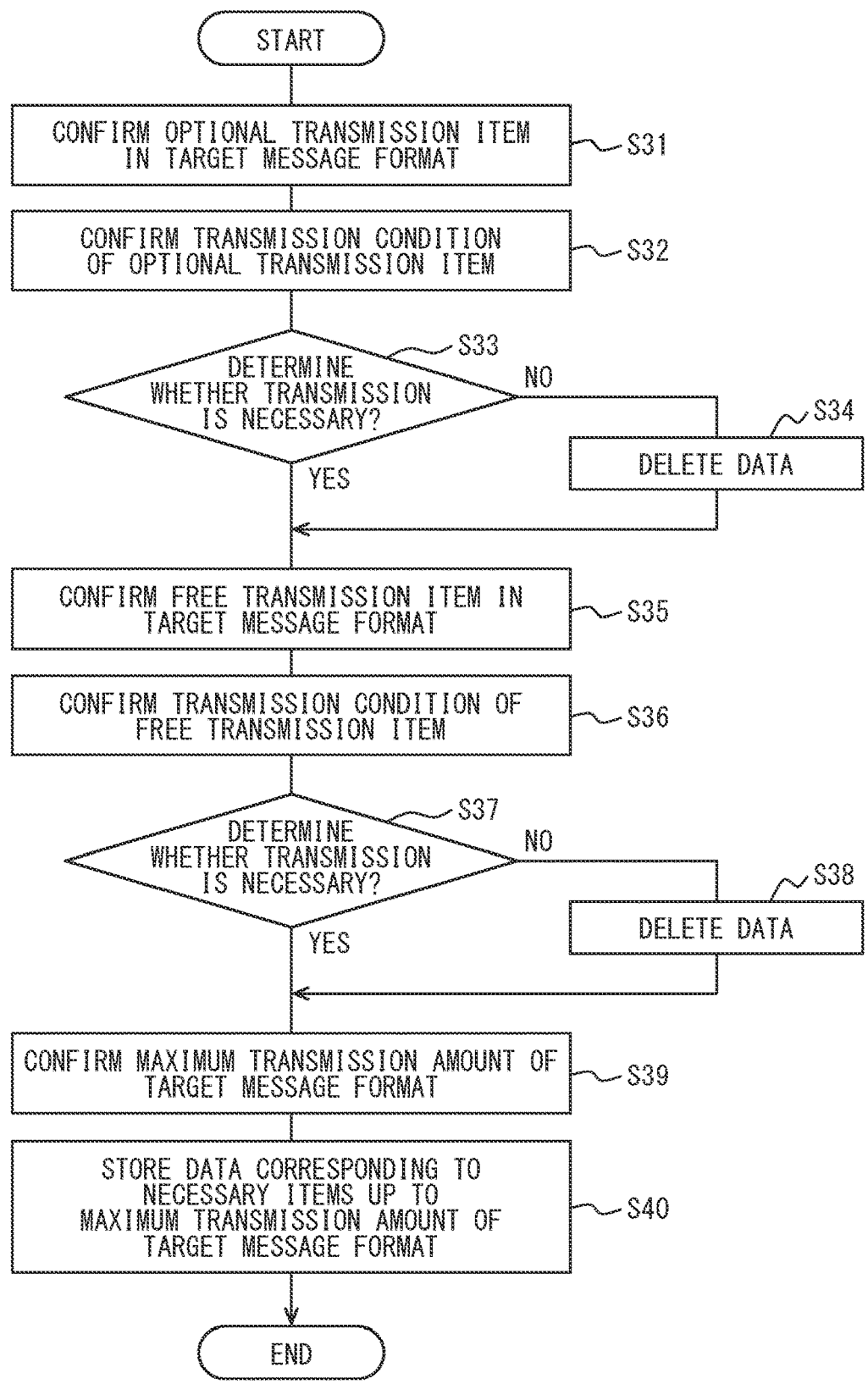
FIG. 8 is a flowchart showing target information transmission control processing.

The target information transmission control processing performed by the target information transmission control unit 16 will be described with reference to FIG. 8.

When the target information transmission control processing is started, the target information transmission control unit 16 confirms the optional transmission item in the target message format (S31), confirms the transmission condition of the optional transmission item (S32), and determines whether or not the transmission of the optional transmission item is necessary (S33, corresponding to a target information transmission control process). When determining that the transmission of the optional transmission item is not necessary (S33: NO), the target information transmission control unit 16 deletes the data corresponding to the optional transmission item for which transmission is unnecessary from the target message format (S34, corresponding to a target information transmission control process). That is, the target information transmission control unit 16 dynamically changes the target message format by deleting the data corresponding to the optional transmission item for which transmission is determined to be unnecessary from the target message format.

The target information transmission control unit 16 confirms the free transmission item in the target message format (S35), confirms the transmission condition of the free transmission item (S36), and determines whether or not the transmission of the free transmission item is necessary (S37, corresponding to a target information transmission control process). When determining that the transmission of the free transmission item is not necessary, the target information transmission control unit 16 deletes the data corresponding to the free transmission item for which transmission is unnecessary from the target message format (S38, corresponding to a target information transmission control process). That is, the target information transmission control unit 16 dynamically changes the target message format by deleting the data corresponding to the free transmission item for which transmission is determined to be unnecessary from the target message format.

The target information transmission control unit 16 confirms the maximum transmission amount of the target message format (S39). The target information transmission control unit 16 stores the data corresponding to the necessary items up to the maximum transmission amount of the target message format (S40), and the target information transmission control processing is terminated.

The present embodiment as described above produces the following operational effects.

The vehicle system 1 identifies, as the identical target or the individual targets, multiple targets identified by multiple target information items detected based on the image information of the camera 10 of the mounted object 9 and the detection information of the millimeter wave sensor 11, and classifies the target that is identified as the identical target between the target within sight and the target out of sight based on the image information of the camera 4 of the subject vehicle and the detection information of the millimeter wave sensor 5. This configuration can provide a safety service by appropriately identifying a target individually and appropriately processing the identified individual according to the situation. That is, the reliability of the system can be improved by identifying multiple targets as either the identical target or individual targets, and the reliability of the system can be improved by limiting the targets to be processed by classifying the targets into the target within sight and the target out of sight.

Also, the vehicle system 1 dynamically changes the target message format when the target information is transmitted. When the target information is broadcast to surrounding vehicles, it is necessary to broadcast the target information to surrounding vehicles within the allowable range of limited data communication volume. Thus, with the dynamical change of the target message format, the configuration can appropriately broadcast the target information to surrounding vehicles within the allowable range of limited data communication volume.

Although the present disclosure has been described in accordance with the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

The controllers and methods described in the present disclosure may be implemented by a special purpose computer which is configured with a memory and a processor programmed to execute one or more particular functions embodied in computer programs of the memory. Alternatively, the controllers described in the present disclosure and the methods thereof may be realized by a dedicated computer configured as a processor with one or more dedicated hardware logic circuits. Alternatively, the controller and methods described in the present disclosure may be realized by one or more dedicated computer, which is configured as a combination of a processor and a memory, which are programmed to perform one or more functions, and a processor which is configured with one or more hardware logic circuits. The control program may also be stored on a computer readable non-transitory tangible recording medium as instructions to be executed by a computer.

What is claimed is:

1. A vehicle system comprising:
   a target information detection unit configured to detect a first target information item related to a target within sight from a subject vehicle based on sensor information of a sensor of the subject vehicle, wherein the within sight from the subject vehicle is within a range directly detected by the sensor of the subject vehicle;
   a target information acquisition unit configured to acquire a plurality of second target information items related to a target detected based on sensor information of a sensor of a mounted object, excluding the subject vehicle;
   a target identification unit configured to identify a plurality of targets individually identified by the plurality of second target information items as an identical target or individual targets; and
   a target classification unit configured to specify the target within sight based on the first target information item from the identical targets identified by the target identification unit, specify a remaining target of the identical targets identified as a target out of sight, and classify the target identified as the identical target into the target within sight or the target out of sight, wherein:
   the target identification unit includes:
      a position correction execution unit configured to perform a position correction over time based on a moving speed and a moving direction with respect to the mounted object;
      a positioning information conversion unit configured to convert positioning information of the subject vehicle into a reference point of a coordinate system;
      a first coordinate system conversion unit configured to convert positioning information of the mounted object into the coordinate system having the reference point of the subject vehicle;
      a second coordinate system conversion unit configured to convert a target identified by the second target information detected based on the sensor information of the sensor of the mounted object into the coordinate system by synthesizing relative distance and moving direction of the target identified by the second target information into the coordinate system;
      a target extraction unit configured to extract targets whose positions overlap in the coordinate system;
      a type determination unit configured to determine whether the targets extracted by the target extraction unit are identical;
      a speed/direction determination unit configured to determine whether the targets determined by the type determination unit to be identical have identical moving speeds and moving directions;
      an individual identification unit configured to identify, as the identical targets, targets of which the speed/direction determination unit determines that both the moving speeds and moving directions are identical; and
   the subject vehicle is controlled to avoid collision with the determined targets.

2. The vehicle system according to claim 1, wherein the individual identification unit identifies, as individual targets, the targets of which the type determination unit determines that the types are not identical.

3. The vehicle system according to claim 1, wherein the individual identification unit identifies, as individual targets, the targets of which the speed/direction determination unit determines that at least ones of the moving speeds and moving directions are not identical.

4. The vehicle system according to claim 1, wherein when positional accuracy of the mounted object is equal to or higher than a predetermined level, the type determination unit determines whether the types of the targets extracted by the target extraction unit are identical.

5. The vehicle system according to claim 1, wherein when reliability of the mounted object is equal to or higher than a predetermined level, the type determination unit determines whether the targets extracted by the target extraction unit are identical.

6. The vehicle system according to claim 1, wherein the target classification unit includes:
   a third coordinate system conversion unit configured to convert a target identified by the target information detected as the first target information item by the target information detection unit into the coordinate system by synthesizing relative distance and moving direction of the target into the coordinate system;
   a within-sight target generation unit configured to generate a target within sight; and
   an out-of-sight target generation unit configured to generate a target out of sight by synthesizing the target identified as the identical target by the target identification unit and the target within sight generated by the within-sight target generation unit.

7. The vehicle system according to claim 1, further comprising
   a target information transmission control unit configured to dynamically change a target message format when the first target information item is transmitted.

8. The vehicle system according to claim 7, wherein the target information transmission control unit includes:
   a first necessity determination unit configured to determine whether transmission of an optional transmission item is necessary; and
   a first data deletion unit, when the first necessity determination unit determines that the transmission of the optional transmission item is not necessary, configured to delete data corresponding to the optional transmission item whose transmission is not necessary from the target message format.

9. The vehicle system according to claim 8, wherein the target information transmission control unit further includes:
   a second necessity determination unit configured to determine whether transmission of a free transmission item is necessary; and
   a second data deletion unit, when the second necessity determination unit determines that the transmission of the free transmission item is not necessary, configured to delete data corresponding to the free transmission item whose transmission is not necessary from the target message format.

10. A non-transitory tangible computer readable storage medium comprising instructions executed by at least one processor of a vehicle system, the instructions comprising:

detecting a first target information item related to a target within sight from a subject vehicle based on sensor information of a sensor of the subject vehicle, wherein the within sight from the subject vehicle is within a range directly detected by the sensor of the subject vehicle;

acquiring a plurality of second target information items related to a target detected based on sensor information of a sensor of a mounted object, excluding the subject vehicle;

identifying a plurality of targets individually identified by the plurality of second target information items as an identical target or individual targets;

specifying the target within sight based on the first target information item from the identified identical targets;

specifying a remaining target of the identical targets identified as a target out of sign;

classifying the target identified as the identical target into the target within sight or the target out of;

performing a position correction over time based on a moving speed and a moving direction with respect to the mounted object;

converting positioning information of the subject vehicle into a reference point of a coordinate system;

converting positioning information of the mounted object into the coordinate system having the reference point of the subject vehicle;

converting a target identified by the second target information detected based on the sensor information of the sensor of the mounted object into the coordinate system by synthesizing relative distance and moving direction of the target identified by the second target information into the coordinate system;

extracting targets whose positions overlap in the coordinate system;

determining whether the extracted targets are identical;

determining whether the identified targets determined to be identical have identical moving speeds and moving directions;

identifying, as the identical targets, targets determined to have both moving speeds and moving directions that are identical; and controlling the subject vehicle to avoid collision with the determined targets.

11. The non-transitory tangible computer readable storage medium according to claim 10, wherein
the instructions further comprising:
dynamically changing a target message format when the first target information item is transmitted.

12. A vehicle system comprising at least one processor configured to:
detect a first target information item related to a target within sight from a subject vehicle based on sensor information of a sensor of the subject vehicle, wherein the within sight from the subject vehicle is within a range directly detected by the sensor of the subject vehicle;

acquire a plurality of second target information items related to a target detected based on sensor information of a sensor of a mounted object, excluding the subject vehicle;

identify a plurality of targets individually identified by the plurality of second target information items as an identical target or individual targets;

specify the target within sign based on the first target information item from the identified identical targets;

specify a remaining target of the identical targets identified as a target out of sign;

classify the target identified as the identical target into the target within sight or the target out of sight;

perform a position correction over time based on a moving speed and a moving direction with respect to the mounted object;

convert positioning information of the subject vehicle into a reference point of a coordinate system;

convert positioning information of the mounted object into the coordinate system having the reference point of the subject vehicle;

convert a target identified by the second target information detected based on the sensor information of the sensor of the mounted object into the coordinate system by synthesizing relative distance and moving direction of the target identified by the second target information into the coordinate system;

extract targets whose positions overlap in the coordinate system;

determine whether the extracted targets are identical;

determine whether the identified targets determined to be identical have identical moving speeds and moving directions;

identify, as the identical targets, targets determined to have both moving speeds and moving directions that are identical; and control the subject vehicle to avoid collision with the determined targets.

* * * * *